Figure 5:
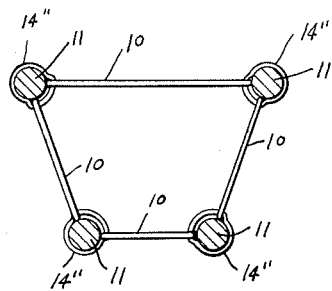

Oct. 6, 1964
S. N. SCHLEIN
3,152,221
LINE SPACER
Filed June 29, 1962
2 Sheets-Sheet 1
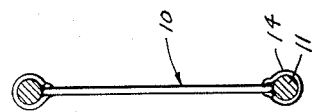
Fig. 2
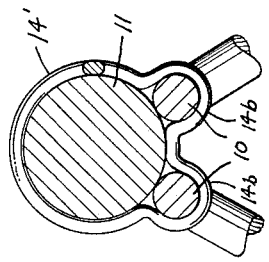
Fig. 6
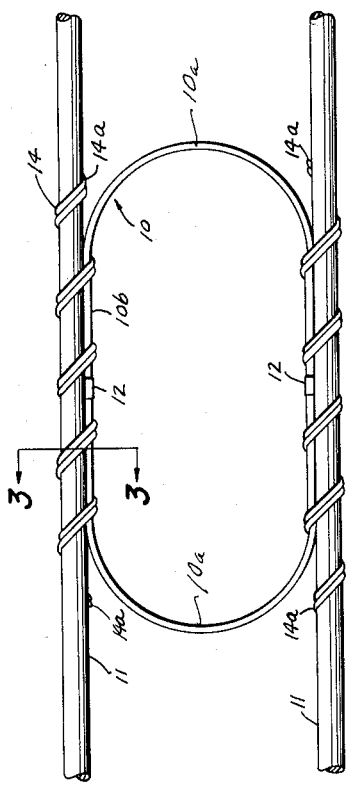
Fig. 1
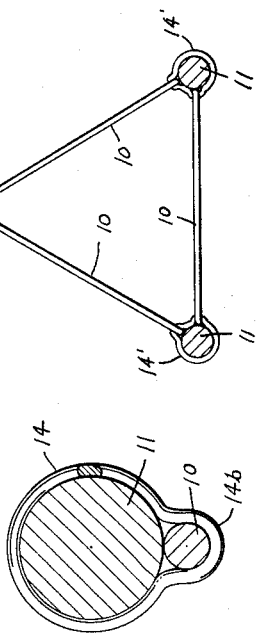
Fig. 4
Fig. 3
INVENTOR.
SEYMOUR N. SCHLEIN
BY *J. D. Douglas*
*His* ATTORNEY Oct. 6, 1964   S. N. SCHLEIN   3,152,221
LINE SPACER Filed June 29, 1962   2 Sheets-Sheet 2

INVENTOR.
SEYMOUR N. SCHLEIN
BY
*J. D. Douglass*
*His* ATTORNEY

United States Patent Office 3,152,221
Patented Oct. 6, 1964

3,152,221
LINE SPACER
Seymour N. Schlein, University Heights, Ohio, assignor to The Fanner Manufacturing Company, a division of Textron, Inc., Cleveland, Ohio, a corporation of Rhode Island
Filed June 29, 1962, Ser. No. 206,247
11 Claims. (Cl. 174—128)

This invention relates to improvements in devices for maintaining the spacing between wires that extend in spaced parallel relation to each other between poles. The wires may be lines for the transmission of power, electrical communications or other purposes.

As is well known to those versed in the art various types of electrical lines, which extend from one place to another, are suspended from towers or poles. The lines are supported at the poles and extend between the poles as catenary spans, the wires of which are usually in spaced substantially parallel relation to each other. These conductors may be what is known as twin conductors and where there are more than two may be called bundled conductors. The length of the catenaries between the poles varies with the type of line and the terrain over which the lines are strung. In any event the lines usually have a predetermined spacing from each other and it is desirable that the spacing between them be controlled so that they do not contact with each other. Although the spacing of the lines may be parallel, there are occasions where the spacing may be angular.

It is highly desirable that adjacent conductors do not contact with each other because such contact causes wear and breakage and arcing or short circuits where there is a potential difference. The contact may be caused by the swaying of the wires due to the wind.

It has therefore become the practice to provide means which is connected between the adjacent lines to hold these lines in the proper spaced relation. Where the lines have the same potential, as in bundled conductors, the tie means may be conductive. If the lines are at different potential the tie means should be insulated from the lines. Among the means previously shown by the prior art for effecting line spacing are the British patent to Perrone No. 739,796, of November 2, 1955, and the Peterson Patent No. 2,959,632.

Among the desirable characteristics of a spacer may be included spacers that are economical to manufacture. Another important feature is that they should be easy to install and remove, and of such construction that they cannot be readily applied in the wrong manner.

It is desirable that the connection of the spacers to the line be such that there are no concentrated or highly localized stresses applied to the line at the point of application and which would cause fatigue of the line at such points with a resultant shortening of the line life. It is also desirable that the spacer itself be of such a construction that the fatigue in the spacer itself be minimized, thus lengthening the life thereof. The spacer should also be versatile in that it can be applied to lines of different sizes and different spacing. Such a spacer should also be one which does not increase the corona losses in high voltage lines.

The spacer of the present invention has all of the foregoing desirable attributes. Still other advantages of the spacer of the present invention and the invention itself will become more apparent from the following description of some embodiments thereof which are illustrated by the accompanying drawings.

Figure 7:
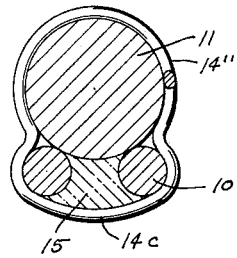
Figure 8:
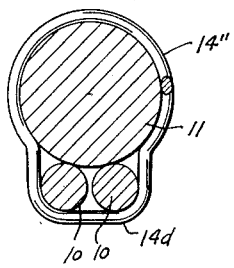
Figure 9:
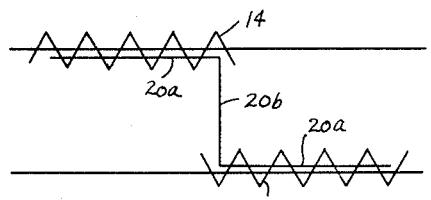
Figure 10:
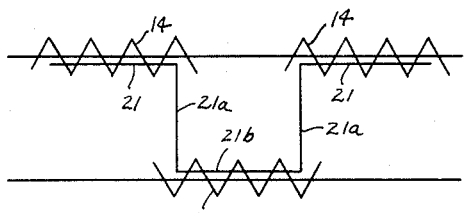
Figure 11:
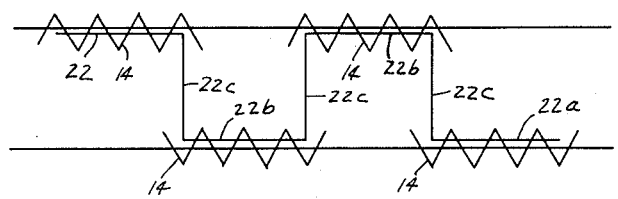

In the drawings:
FIG. 1 is a plan view of the spacer means attached to a pair of conductors;
FIG. 2 is an end view thereof;
FIG. 3 is an enlarged section taken on the line 3—3 of FIG. 1;
FIGS. 4 and 5 are views similar to FIG. 2 of the invention applied to 3 and 4 wire bundle conductors;
FIGS. 6, 7, and 8 are views similar to FIG. 3 of modifications thereof; and
FIGS. 9, 10, and 11 are diagrammatic views of three other forms of the invention.

Referring now to the drawings, throughout which like parts have been designated by like reference characters.

In its broader aspects the invention contemplates the use of a spacer member, which is preferably flexible, and which bridges the space between the lines and is secured to the lines by fastening means comprising a preformed helical element or elements of resilient material having an internal diameter less than the line and arranged to be applied to the line and the spacer element simultaneously without permanent deformation of the helix. The material may be metal or plastic, and of hard drawn resilient material.

As best shown in FIG. 1, one form of the invention contemplates a loop of material 10 having rounded ends 10a and straight sides 10b. The sides 10a are spaced apart a distance substantially equal to the spacing between the lines 11. The loop may be of plastic but is preferably made of hard drawn resilient wire where springiness is desired, having the ends secured together by a sleeve 12 which is crimped upon the ends of the wire. It may also be of a rigid material. It could also be made as a continuous loop by butt welding the ends together. It may also be made in two U shaped parts, the ends of which are secured by a pair of sleeves 12.

It may be insulated, if it is to be used to hold two lines of opposite polarity or a pair of lines such as communication lines. It is pointed out that it could be made of a suitable plastic or resin with or without a reinforcing wire if desired.

The loop is secured to the wires by one or more preformed helical elements 14. These elements may each comprise a hard drawn resilient wire in the form of an open helix having an inside diameter less than that of the line. Preferably it should have a pitch that is less than that of the lines but in the same direction of lay. The direction may, however, be opposite to that of the line. It may also be of any lay and pitch so long as it can be applied to the loop and line without permanent deformation.

Such a securing element may be used to attach the loop to the line by laying the loop with the flat side 10b alongside the line and then placing the securing element across the side 10b of the loop and the line and wrapping the element around both the side of the loop and the line for a number of revolutions. The helical element should preferably be long enough so that the loop is secured to the line by several wraps of the securing element and the securing element then extends beyond the loop along the line for one or more wraps.

One side of the loop having been secured to the line in the manner above described, the other side may now be secured in a like manner to the adjacent line. After installation the loop takes a position between the lines where the loop is between the closest portion of the two lines, that is opposite to a diameter common to both lines.

When applied, the loop holds the two lines resiliently against movement toward and away from each other. It will be noted that this holding is not rigid because the parts 10a of the loop can flex to a straighter or a more acute bend. Thus a wave of movement traveling along the lines toward the loop which is out of phase to any degree, as between the lines, is not met by a sudden rigid resistance but by a resilient springy resistance which causes the wave to be dampened and the shock to be resiliently absorbed. This prevents fatigue of the lines at the points where the loop is attached and the stresses are distributed along the lines for the full distance where the lines and loop are secured together without any highly localized bending stresses being present.

Movements of the two line parts toward and away from each other, which could reach a magnitude such that the two lines would hit each other, or, that might cause the lines to wrap together, are prevented. On the other hand, the movement of the two lines in planes that are transverse to a common diameter through the line which are in lines transverse to the loop and are out of phase with each other are to a certain extent possible because the sides 10b of the loop may turn in their fastening, permitting one line to move in a direction opposite to the other line, although the spacing is still maintained. This causes the movement to be converted to an arcuate movement which also assists in a suppression of these vibrations.

Another feature of this invention resides in the fact that the device is very useful in conjunction with the suspension of galloping in power transmission lines. The structure is such that in high voltage lines it does not enhance the corona losses because there are no sharp points that extend toward the outside of the electrostatic field set up by the high voltage lines, the loop being between the lines and disposed within this field. Furthermore the fastener members are so designed that the extreme ends 14a are disposed on the innermost portion of the lines within that field.

In order to expedite the installation of the device on the line, to assure that the loop will be on the inside of the lines at the points where the lines are closest to each other, to facilitate the turning movement of the loop in its fastening means and to decrease the amount of friction of the loop against the line, the helix is provided with a series of outwardly formed portions 14b which are in alignment with each other and which provide a plurality of aligned sockets in which the flat side 10b of the loop 10 is disposed, as best shown in FIG. 3.

This expedient also assures that the device will be assembled on the line in the proper manner, with the socket portions on the opposite lines extending toward each other. Since this insures the proper installation it also assures that the ends 14a will be toward and within the electrostatic field and prevents corona losses.

A preferred manner of forming the attaching means is to first form the wire into a helix and to then form the sockets by the use of suitable dies.

It is also contemplated that sockets or notches 14b could be provided by bending the wire to provide an eye which could be closed if desired. Eyes could also be provided by spot welding preformed rings to the exterior of the helix in alignment with each other.

As previously stated, the device may be used with bundled conductors where three or more conductors carry the same phase.

FIG. 4 illustrates the manner of application to bundled conductors having three lines disposed in triangular formation. The loops 10 extend between the three conductors and are held in place by the holding elements 14' as described in FIG. 1. They are installed in the same manner as described except that two of the loops are secured to each conductor with the opposite sides of the two loops secured, one to each of the other two conductors.

FIG. 5 shows a similar arrangement for a line comprised of four bundled conductors 11 with four loops 10 held to the conductors by four sets of elements 14''. It is apparent that in this instance the spacing between the lines could all be equal although unequal spacing has been shown.

As best shown in FIG. 6, the fastener element 14' is provided with two sockets 14b which are spaced 60 degrees apart, which provides all the advantages previously enumerated. This provides a triangular configuration which holds the wires in the desired spaced relation.

FIG. 7 shows another form of securing element wherein the socket 14c of the element 14'' has been formed as one single elongated socket with the extremities 60 degrees apart. It is pointed out that this socket could also be made as illustrated in FIG. 8 wherein the socket 14d is of sufficient width to accommodate the two loop members 10 in juxtaposed position to each other. This has the advantage that the two loops cannot slide in the socket as they could in FIG. 7, although it is contemplated that a spacer 15 could optionally be used to hold the two loops in position, as shown by the dotted line in FIG. 7.

It will be apparent that the sockets for the four bundle conductors could be 90° apart where they are arranged in a square configuration. The arrangement of FIG. 5, however, has the advantage that being of unequal width there is no opportunity of the loops to move in opposite directions and allow the lines to come together.

Although the loops have sufficient resiliency that they provide some accommodation for lines of different spacing, it is contemplated that loops with the sides 10b different spaced distances apart be used with the spacing corresponding to the spacing of the lines at the particular point of application.

So far the invention has been described in conjunction with the use of a closed loop. It is also contemplated that the spacing element may take other configurations such as is illustrated diagrammatically in FIGS. 9 to 11 inclusive. In FIG. 9 the spacer comprises a pair of legs 20a each of which extends along the opposite lines and a bridging portion 20b which connects the legs together and spans the space between the line. In this instance, two of the holding elements 14 would be used.

In FIG. 10 the spacer is provided with two outer legs 21 which extend along one line and two bridging parts 21a which span the space between the lines and connected to a third intermediate run 21b which extends along the opposite line. In this instance, three of the holding elements would be used.

FIG. 11 shows a further construction in that a first run 22 extends along the lines and an end run 22a along the other line and two intermediate runs 22b are provided connected by three parts 22c which span the space and connect the runs together. In this instance, four of the holding elements could be used or two longer elements could replace the four.

Having thus described the invention in some embodiments thereof, I am aware that numerous and extensive departures may be made therefrom without departing from the spirit and scope of the invention as defined in the appended claims.

I claim:

1. In combination with spaced lines, means for holding said lines in spaced relation to each other including a spacer element comprising a closed elongated loop spanning the space between the lines and having substantially straight portions extending along the sides of the lines which are facing each other and being in juxtaposition therewith, and means for holding said element to the lines for substantially the full length of each of the parts of the spacer element which are in juxtaposition with the lines comprising at least one preformed open helical element of resilient material for each line wrapped around the line and the part of the spacer element juxtaposed to the line.

2. The combination as described in claim 1, wherein each of the helical elements includes an intermediate portion wrapped around one of the lines and one of the straight portions of the spacer element juxtaposed to the line, and at least one helical portion extending beyond the spacer element and wrapped around the line.

3. The combination as described in claim 2, wherein each of the helical elements has an inner diameter less than the line it is wrapped around at the place where it is wrapped around the line.

4. The combination as described in claim 3, wherein both ends of each of the helical elements extend beyond the straight portions of the spacer element.

5. The combination as described in claim 2, wherein each of the helical elements includes outwardly extending portions formed to provide a series of sockets disposed in longitudinal alignment with each other and each of said series of said sockets receives one of the substantially straight portions of said spacer element and holds it adjacent said one line.

6. The combination as described in claim 1, wherein each of the helical elements is provided with outwardly extending portions formed to provide sockets through which the spacer element extends.

7. The combination as described in claim 6 wherein said sockets of each helical element are disposed in longitudinal alignment with each other.

8. The combination as described in claim 7, wherein said sockets hold the spacer element within the space defined by the lines to which the spacer device is attached.

9. The combination as described in claim 6, wherein the sockets of each helical element are spaced from each other along one of the lines to which the element is attached.

10. The combination as described in claim 6, wherein said socket elements have a width such that they hold more than one spacer element.

11. The combination as described in claim 6 wherein the sockets provided on at least one of said helical elements are elongated in a direction circumferentially of the line to which said one helical element is attached, a second spacer element extending through the circumferentially elongated sockets, and filler means in the circumferentially elongated sockets maintaining the spacer elements extending therethrough separated from each other.

References Cited in the file of this patent
UNITED STATES PATENTS

| | | |
|---|---|---|
| 510,040 | Miller | Dec. 5, 1893 |
| 1,688,954 | Atkinson | Oct. 23, 1928 |
| 2,384,440 | Carr | Sept. 11, 1945 |
| 2,509,422 | Clapp | May 30, 1950 |
| 2,736,398 | Peterson | Feb. 28, 1956 |
| 2,953,624 | Perrone et al. | Sept. 20, 1960 |
| 2,959,632 | Peterson | Nov. 8, 1960 |

OTHER REFERENCES

Doubles 115-Kv. Line Conducting, Electrical World, March 25, 1957, pages 98 and 99.